United States Patent [19]

Miller et al.

[11] Patent Number: 5,259,874

[45] Date of Patent: Nov. 9, 1993

[54] SOLID INK COMPOSITIONS SUITABLE FOR USE IN COLOR TRANSPARENCIES

[75] Inventors: Robert J. Miller, Burlingame; Young S. You, Los Altos; Howard S. Tom, San Jose; An-Chung R. Lin, Cupertino, all of Calif.

[73] Assignee: Hewlett-Packard Company, Palo Alto, Calif.

[21] Appl. No.: 780,598

[22] Filed: Oct. 23, 1991

[51] Int. Cl.$^5$ .................. C09D 11/02; B05D 5/06
[52] U.S. Cl. .................. 106/20 R; 106/30 R; 106/30 A; 106/31 R; 346/140 R; 427/164
[58] Field of Search .............. 106/20 R, 30 R, 30 A, 106/31 R; 346/140 R; 427/164

[56] References Cited

U.S. PATENT DOCUMENTS

| | | | |
|---|---|---|---|
| 4,490,728 | 12/1984 | Vaught et al. | 346/140 R |
| 4,490,731 | 12/1984 | Vaught et al. | 106/22 |
| 4,745,420 | 5/1988 | Gerstenmaier | 346/140 R |
| 4,801,473 | 1/1989 | Creagh et al. | 427/164 |
| 5,000,786 | 3/1991 | Matsuzaki | 106/20 |
| 5,006,170 | 4/1991 | Schwarz et al. | 106/20 |
| 5,102,460 | 4/1992 | You et al. | 106/30 |
| 5,118,347 | 9/1992 | You et al. | 106/20 |
| 5,151,120 | 9/1992 | You et al. | 106/27 |
| 5,161,120 | 9/1992 | You et al. | 106/27 R |

FOREIGN PATENT DOCUMENTS 308117A 6/1988 European Pat. Off.

OTHER PUBLICATIONS

Lloyd et al., Ink Jet Printing, pp. 311-369 (1988).

Primary Examiner—Helene Klemanski

[57] ABSTRACT

Disclosed herein are substantially homogeneous solid ink-jet ink compositions. The use of such compositions with colored transparencies substantially reduces the level of light scattering as compared to the level of light scattering arising from the use of non-homogeneous ink-jet ink compositions. It is also disclosed that further improvements in the ink-jet ink composition can be achieved by employing a cosolvent in the composition.

22 Claims, 2 Drawing Sheets

FIG._IA
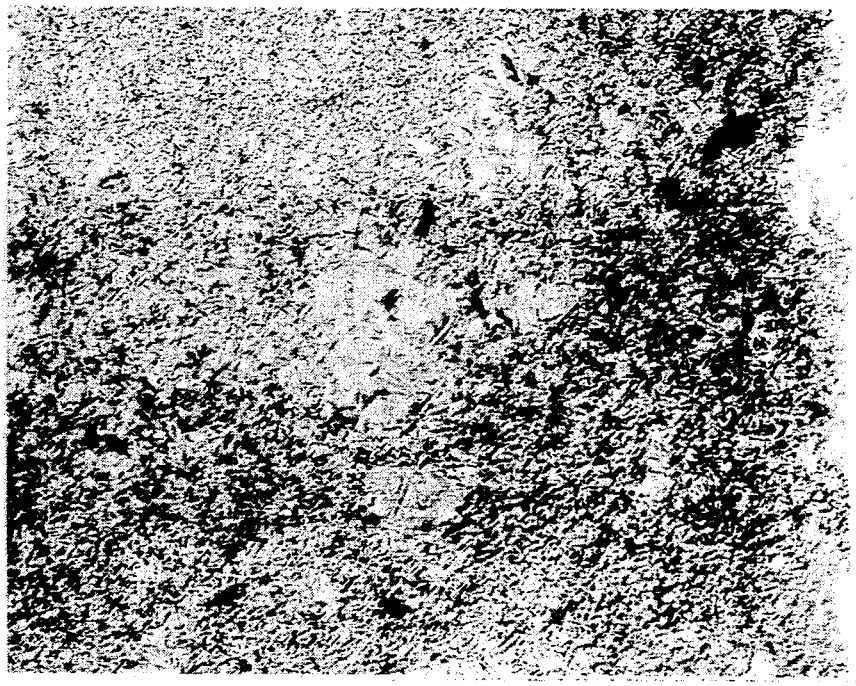
FIG._IB

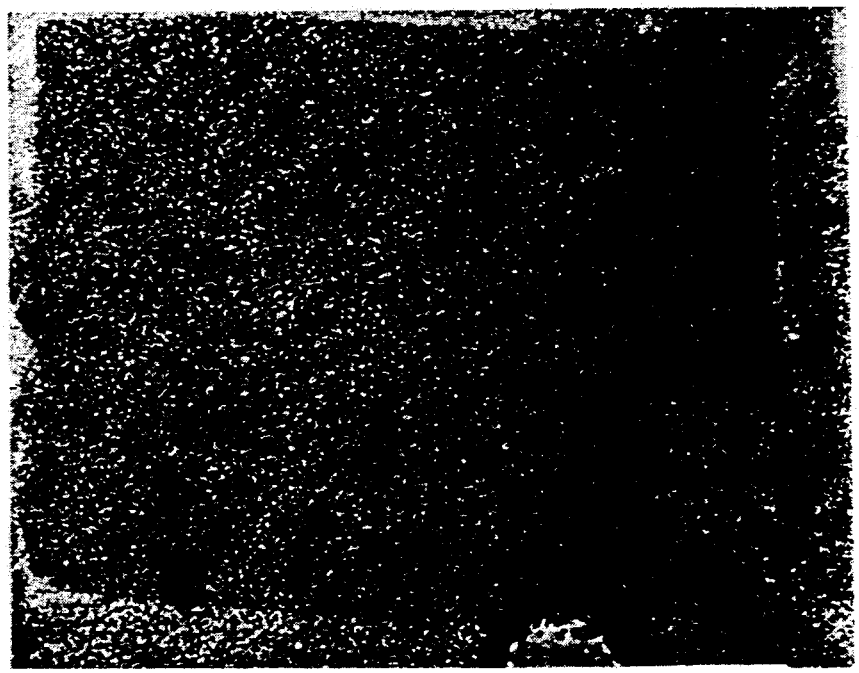
FIG._2

SOLID INK COMPOSITIONS SUITABLE FOR USE IN COLOR TRANSPARENCIES

BACKGROUND OF THE INVENTION

1. Field of the Invention.

The present invention is directed to solid ink-jet ink compositions suitable for use in color transparencies. Specifically, the present invention is directed to a substantially homogeneous solid ink-jet ink composition comprising a carrier and a non-volatile driver. Typically, these compositions also will contain a colorant and, in a preferred embodiment, such solid ink-jet ink compositions further contain a cosolvent. The present invention is also directed to methods for preparing colored transparencies.

2. References Cited.

The following references are cited in this application as superscript numbers at the relevant portion of the application:
1. Vaught, U.S. Pat. No. 4,490,731
2. Lloyd et al., Ink Jet Printing, pp. 311–369 (1988)
3. Vaught et al., U.S. Pat. No. 4,490,728
4. Gerstenmaier, U.S. Pat. No. 4,745,420;
5. Creagh et al., U.S. Pat. No. 4,801,473; and
6. Van Brimer et al., European Pat. Appl. Pub. No. 308 117A

3. State of the Art.

Solid ink-jet ink compositions have been successfully employed in thermal ink-jet printing utilizing thermally induced vapor bubbles as a driving force to eject ink drops out of the nozzle of the jet printer and onto the substrate. See, for example, Vaught [1], Lloyd et al. [2], and Vaught et al. [3] which are incorporated herein by reference in their entirety.

Such solid ink-jet ink compositions preferably contain as separate ingredients, a carrier and a driver and can additionally contain a colorant as well as any optional additives. The carrier is an organic material which carries any colorant(s) and which is a solid at room temperature (i.e., about 25° C.) and a liquid at the operating temperature of the print head (e.g., about 90° C. to 120° C.). The driver is a bubble-forming substance which can provide enough driving force to eject ink drops from the print head or nozzle. The colorant can be a dye or pigment, which is compatible (soluble or dispersible) in the carrier and which produces the visible printed images on the substrate.

In practice, a portion of the solid ink-jet ink composition in the print head of the thermal ink-jet printer is first liquified and then a portion of driver found in the so liquified ink is vaporized so as to generate a bubble which is used to force a drop of the liquified ink from the injection nozzle of the print head onto the substrate.

While such ink-jet ink compositions are successfully employed on substrates such as paper, there is a problem when such compositions are employed for preparing colored transparencies for projecting colored images via an overhead projector. Specifically, color printing on transparent substrates is complicated by the fact that current thermal ink-jet printers have difficulty in generating colored transparencies having good color clarification of the projected image and, in fact, produce colors having grayish shades and poor color definition.

In regard to the above, color projection via an overhead projector would be theoretically achieved by passing visible light through a transparent substrate having appropriately deposited thereon colored but otherwise translucent ink compositions. A portion of the light penetrating the transparency would then be absorbed by the ink composition in that portion of the spectrum corresponding to the color of the ink with the remainder of the light passing unaffected through the transparency. This non-absorbed light is then projected by the overhead projector onto the screen or other viewing device so as to provide a colored projection (i.e., the color of the projection corresponds to the color of the ink compositions).

However, while theoretically sound, there is a continuing problem with prior art ink-jet ink compositions suitable for use with thermal ink-jet printers which eject ink drops by bubble formation. Specifically, these compositions do not provide excellent colored transparencies because as heretofore formulated, these compositions do not permit the non-absorbed light to pass through unaffected but instead the composition causes excessive scattering of the non-absorbed light as it passes through the ink composition. This excessive scattering leads to the difficulties in correlating the projected color with the color found on the transparency and a grayish image is projected.

It has now been found that such excessive scattering is associated with difficulties in forming a miscible multicomponent ink-jet ink composition which is stable from room temperature (typically the storage temperature of the ink composition) to about 90° C. to 120° C. (typically the operating temperature range of a print head). Specifically, if the ink composition is not stable and miscible, then the composition will have or will develop regions of different physical and/or chemical environments therein which, in turn, leads to excessive light scattering because each beam of light passing through a different portion of the supposedly same ink composition can encounter a different physical and/or chemical environment compared to a different beam of light.

Without being limited to any theory, this problem with excessive light scattering is believed to be primarily associated with the use of the driver in the solid ink-jet ink composition. Specifically, because the carrier and the colorant are typically hydrophobic, high boiling point materials, these materials will generally be soluble in each other and, when mixed at elevated temperatures in a liquid phase, will provide for a miscible multi-component composition which is stable from room temperature (typically the storage temperature of the ink composition) to about 90° C. to 120° C. (typically the operating temperature range of a print head). In turn, a stable miscible composition obviates the problem with light scattering because with such a composition, light beams penetrating different portions of such a composition will encounter a similar physical and/or chemical environment.

On the other hand, the driver is typically a component which is more hydrophilic and more volatile (e.g., has a lower boiling point) than the either the carrier or the colorant. In fact, most drivers heretofore employed in ink-jet ink compositions are typically liquids at room temperature. Accordingly, formulating a miscible multi-component solution which is stable from room temperature (typically the storage temperature of the ink composition) to about 90° C. to 120° C. (typically the operating temperature range of a print head) is unlikely if a volatile driver is employed. Such instability can lead to regions in the ink composition which are amorphous and to regions which are crystalline. In such a case, light beams penetrating different parts of such an ink composition will likely encounter different physical and/or chemical environments which, as noted above, leads to increased levels of light scattering.

Moreover, even when a stable composition is formed, if a volatile driver is employed in such a composition, over time a portion of the driver can evaporate from the composition. Because the rate of evaporation from the surface of the composition as compared to the interior of the composition is non-uniform, such non-uniform evaporation will result in regions of different physical and/or chemical environments within the composition, which as noted above, leads to increased levels of light scattering.

As a further complication, the use of a non-volatile driver can nevertheless result in excessive light scattering. Specifically, non-volatile drivers are non-volatile at room temperature in the ink composition but which possess sufficient volatility so as to effectively form vapor bubbles at the operating conditions of the print head. Such non-volatile drivers are nevertheless still more hydrophilic than either the carrier or the colorant and accordingly, these drivers will typically have limited solubility with such other components. Because of its low solubility in the ink composition, solid ink-jet ink compositions containing such drivers can result, over a period of time, in some phase separation which results in the formation of driver granules (including driver crystals), when the driver is a solid, and in the formation of globules or vesicles, when the driver is a liquid. Such granular or globular formation can lead to regions in the ink composition which have different physical and/or chemical environments, particularly if the granule or globule size is sufficiently large, which can lead to increased levels of light scattering.

In view of the above, while it would be particularly desirable for solid ink-jet ink compositions containing a driver to produce colored transparencies with excellent color projection, such was not possible with driver containing solid ink-jet ink compositions heretofore known.

SUMMARY OF THE INVENTION

The present invention is directed to the discovery that solid ink-jet ink compositions which are substantially non-volatile (i.e., compositions which will not result in more than 5% weight loss when stored for 30 days at 22° C. and 1 atmosphere) will produce good colored transparencies if the components comprising these compositions are thoroughly mixed so as to provide a substantially homogeneous composition. Surprisingly, it has been found that with such substantially homogeneous compositions, any granular or globular formation of the driver or of any other component in the composition will provide for granules or globules which are so small so as to result in minimal light scattering effect.

The present invention is further directed to the discovery that the use of an additive in the ink-jet ink composition which acts as a cosolvent between the carrier and the driver facilitates the formation of a miscible and stable ink-jet ink composition, i.e., an ink composition less susceptible to granular or globular formation.

In view of the above, in one of its composition aspects, the present invention is directed to an ink-jet ink composition which is solid at 25° C. and liquid at the operating temperature of the print head of the ink jet and which is suitable for use in preparing colored transparencies which composition comprises:

(a) a carrier which is translucent to visible light and which is solid at 25° C. and liquid at the operating temperature of the print head of the ink-jet; and (b) a non-volatile driver which has a solubility of at least 10% in the carrier and which is translucent to visible light when combined in the ink-jet ink composition, and wherein the composition is sufficiently homogeneous so as to provide for haze meter readings of less than about 15 when a 1 mil thick sample of the composition is placed on a transparency.

In another composition aspect, the present invention is directed to an ink-jet ink composition which is solid at 25° C. and liquid at the operating temperature of the print head of the ink-jet and which is suitable for use in preparing colored transparencies which composition comprises:

(a) a carrier which is translucent to visible light and which is solid at 25° C. and liquid at the operating temperature of the print head of the ink-jet;

(b) a non-volatile driver which has a solubility of at least 10% in the carrier and which is translucent to visible light when combined in the ink-jet ink composition; and (c) a cosolvent, and wherein the composition is sufficiently homogeneous so as to provide for haze meter readings of less than about 15 when a 1 mil thick sample of the composition is placed on a transparency.

In one of its method aspects, the present invention is directed to a method for preparing a colored transparency from a thermal ink-jet printer which method comprises:

(a) selecting an ink-jet ink composition which is a solid at 25° C. and a liquid at the operating temperature of the print head of the ink-jet which composition comprises a carrier which is translucent to visible light and which is solid at 25° C. and liquid at the operating temperature of the print head of an ink-jet, a non-volatile driver which has a solubility of at least 10% in the carrier and which is translucent to visible light when combined in the ink-jet ink composition, and a colorant wherein said ink composition is sufficiently homogeneous so as to provide for haze meter readings of less than about 15 when a 1 mil thick sample of the composition is placed on a transparency; and (b) employing said ink-jet ink composition in a thermal ink-jet printer used for preparing a transparency; and (c) preparing said transparency.

In another of its method aspects, the present invention is directed to a method for preparing a colored transparency from a thermal ink-jet printer which method comprises (a) selecting an ink-jet ink composition which is solid at 25° C. and liquid at the operating temperature of the print head of the ink-jet which composition comprises a carrier which is translucent to visible light and which is solid at 25° C. and liquid at the operating temperature of the print head of an ink-jet, a non-volatile driver which has a solubility of at least 10% in the carrier and which is translucent to visible light when combined in the ink-jet ink composition, a colorant, and a cosolvent wherein said ink composition is sufficiently homogeneous so as to provide for haze meter readings of less than about 15 when a 1 mil thick sample of the composition is placed on a transparency; and (b) employing said ink composition in said thermal ink-jet printer used for preparing transparencies; and (c) preparing said transparencies.

BRIEF DESCRIPTION OF THE DRAWINGS

FIGS. 1A and 1B illustrate photomicrographs of non-homogeneous ink-jet ink compositions. In FIG. 1A, the photomicrograph illustrates multiple crystalline phases in a non-homogeneous ink composition comprising 15 weight percent neopentanol, 15 weight percent 2,3-butanediol, 70 weight percent stearic acid.

In FIG. 1B, the photomicrograph illustrates two different crystals in a non-homogeneous ink composition comprising 15 weight percent neopentanol, 15 weight percent 2,3-butanediol, 10 weight percent stearic acid, and 60 weight percent paraffin.

FIG. 2 illustrates a photomicrograph of a substantially homogeneous ink-jet ink composition comprising 15 weight percent neopentanol, 15 weight percent 2,3-butanediol, and 70 weight percent of Durawax C. In FIG. 2, the photomicrograph illustrates that this ink-jet ink composition is substantially homogeneous.

DETAILED DESCRIPTION OF THE INVENTION

The present invention is directed to solid ink-jet ink compositions that greatly mitigate the problems arising with the preparation of colored transparencies. The ink-jet ink compositions of this invention comprise at least two components, namely a carrier and a driver. These ink-jet ink compositions typically will also contain a colorant, unless a white or off-white image is intended. In a preferred embodiment, the ink-jet ink compositions also contain a cosolvent. In still a further preferred embodiment, the ink-jet ink compositions contain a compatible translucent additive so as to increase the translucency of the composition to visible light.

These compositions are formulated so as to be substantially homogeneous. When so formulated, the herein described compositions provide for colored transparencies with improved color projection as compared to compositions which are not substantially homogeneous. However, prior to describing this invention in detail, the following terms will first be defined.

1. Definitions

As used herein, the following terms have the following definitions:

The term "solid ink-jet ink composition" refers to an ink composition which is solid at room temperature (about 25° C.) and liquid at the operating temperature of the print head of the ink-jet (about 90° to about 120° C.) and which comprises a carrier and a non-volatile driver. Typically, unless a white or an off-white image is intended, the composition will also contain a colorant. In a preferred embodiment, the solid ink-jet ink composition will also include a cosolvent. In the absence of colorant, the ink-jet ink composition is sufficiently translucent to visible light so as to pass at least 65% of visible light, and preferably at least about 85% of visible light through a 1 mil thickness of the sample (e.g., carrier) supported on a transparent substrate such as glass, polyester, and the like.

The term "a substantially homogeneous ink-jet ink composition" means that the carrier, driver and any optional ingredients are so uniformly mixed that the composition will provide for minimal light scattering (i.e., a 1 mil thick sample of the composition on a transparent substrate will provide haze meter readings of less than about 15, preferably less than about 10 and most preferably less than about 7). In this regard, it is noted that a haze meter measures the extent of light scattering. It is further noted that a homogeneous composition will produce less light scattering as compared to non-homogeneous compositions In view of the above, the extent that a composition is homogeneous is directly related to the extent of light scattering and accordingly, haze meter readings of less than about 15 evidence the fact that the tested composition is substantially homogeneous.

The term "translucent to visible light" as it refers to carriers, cosolvents, translucent compatible additives, and ink jet ink compositions (without colorant) means that at least 65% of visible light, and preferably at least about 85% of visible light, will pass through or be transmitted through a 1 mil thickness of the sample [e.g., the carrier, the cosolvent, the translucent compatible additive, or the ink-jet ink composition (without colorant)] supported on a transparent substrate such as glass, polyester, and the like.

The term "carrier" refers to any translucent organic material which is a solid at 25° C., liquid at the operating temperature of the ink-jet, and which is capable of carrying any colorants, i.e., the colorants are compatible (soluble or dispersible) with the carrier at operating temperatures. Suitable carriers include waxes, plastics, polymers, oligomers and the like.

As noted above, the carrier must be liquid at the operating temperature of the print head. Because the carriers and ink compositions which are useful for this invention may not have sharply defined melting points, the term "liquid" as used herein and as applied to the carrier and/or ink composition includes the carriers and ink compositions in a condition in which they can flow through a printing jet and the term "melting point" refers to the lowest temperature of the carrier and/or ink composition which permits them to flow through a printing jet. In this regard, in order to prevent premature freezing of the ink-jet composition onto the substrate which can cause, among other things, raised dots on the substrate, clogging and/or crusting of the ink in the ink-jets, and the like, the temperature differential between the operating temperature of the print head in the ink-jet and the melting point of the solid ink composition should be at least 10° C., preferably at least 20° C. That is to say that the ink composition should melt at least 10° C., preferably at least 20° C., below the operating temperature of the print head of the ink-jet. Additionally, as noted below, the temperature differential between the operating temperature of the print head and the temperature of the substrate should not be more than 100° C. and preferably, not more than 80° C. That is to say that the operating temperature of the print head should be no more than 100° C. and preferably, no more than 80° C. above the temperature of the substrate.

It is essential that the material selected as the carrier be translucent to visible light. Not all materials are translucent to visible light. For example, carriers such as stearic acid, carnauba wax and Kenamide E are not translucent and accordingly, are unsuitable by themselves for use as carriers in the compositions described herein. On the other hand, suitable translucent carriers include Durawax C, rosin, abietic acid, and the like. When mixtures of carriers are employed, then the mixture should be translucent to visible light.

Additionally, the selected carrier should not introduce other problems into the thermal ink-jet composition. For example, the carrier should be stable at the temperature of the printing process, it should not chemically react with those portions of the structure that it contacts nor should it crust and/or clog in the ink-jets and it should not be poisonous or otherwise noxious. The carrier can be a mixture of materials.

The term "driver" refers to a bubble-forming substance, which can provide enough driving force to eject ink drops from the print head or nozzle of a thermal ink-jet printer, at its operating temperature, and which is non-volatile (as defined below) in the ink-jet ink composition. The driver is chosen to be at least 10 percent soluble in the carrier wherein solubility is measured at 25° C. Additionally, the material selected as the driver should not introduce other problems into the solid ink-jet composition. For example, the driver should be stable at the temperature of the printing process, it should not chemically react with those portions of the structure that it contacts nor should it crust in the ink-jets and the combination of the carrier and driver should be translucent to visible light. Additionally, the driver should not be poisonous or otherwise noxious.

In order to function properly as a driver, the driver should have a boiling point of from about 100° to less than about 300° C. and, preferably, from about 150° C. to 250° C., and even more preferably, between 195° C. and 220° C. and should have critical pressure of greater than 10 atmospheres and preferably greater than 15 atmospheres and should be non-volatile in the ink-jet ink composition (as defined below).

In particular, the ink composition containing the driver is generally heated by a resister which achieves a maximum temperature of about 300°-400° C. when electric pulses are passed through. Accordingly, if the driver has a boiling point of greater than about 300° C., then explosive formation of a bubble may not form under these conditions.

Additionally, as noted above, suitable drivers have a critical pressure of greater than 10 atmospheres and preferably greater than 15 atmospheres. Such high critical pressures permit the driver to be highly superheated so that bubble nucleation occurs rapidly to efficiently drive the ink composition from the jets.

As used herein, the term "non-volatile driver" means a solid or liquid driver which, when combined in appropriate ratios with a carrier, will not result in more than 5% weight loss of the carrier/driver composition when this composition is stored for 30 days at 22° C. and 1 atmosphere.

The specific non-volatile driver chosen is not critical provided it meets the above-defined criteria. Suitable non-volatile drivers include, by way of example, propionamide, isobutyamide, and the like. Other suitable non-volatile drivers are disclosed in U.S. Ser. No. 07/671,590 (filed on Mar. 19, 1991, and entitled "Solid Driver for the Solid Ink Jet Ink") which application is incorporated herein by reference in its entirety. Mixtures of non-volatile drivers can be also be used provided that the mixture meets the above-defined criteria.

The term "colorant" refers to a dye or pigment, which is compatible (soluble or dispersible) in the carrier and which produces the visible colored images on the substrate. The particular colorant employed is not critical provided that the ink composition containing the colorant is translucent to the non-absorbed visible color(s). Additionally, the colorant should be stable at the temperature of the printing process, should not chemically react with those portions of the structure that it contacts and should not be poisonous or otherwise noxious. Suitable colorants include those heretofore used in transparencies including, for example, Morfast 101 (available from Morton Thiokol) Neptune Red (available from Morton Thiokol) and the like.

It is contemplated that certain colors will be produced by overlaying one ink composition over another. For example, a green dot can be generated by placing a yellow dot over a blue dot. In such cases, the sample to be measured for translucency to non-absorbed visible light is the combination of the two ink compositions. As is apparent to one skilled in the art, in order for the combined sample to be translucent to the non-absorbed visible light, each of the individual dots will need to transmit a substantially higher amount of the non-absorbed light.

The term "cosolvent" refers to an additive which is translucent to visible light and in which both the carrier and the driver are miscible. The cosolvent also should be non-volatile which is to say that the ink-jet ink composition containing an appropriate concentration of the cosolvent will not result in more than 5% weight loss when this composition is stored for 30 days at 22° C. and 1 atmosphere. Additionally, the cosolvent should be stable at the temperature of the printing process, should not chemically react with those portions of the structure that it contacts and should not be poisonous or otherwise noxious.

The particular cosolvent employed is not critical provided it meets the above criteria. Suitable cosolvents include, for example, stearamide, propyl phenol, 4-hydroxybenzyl alcohol, butylphenol, and the like.

The term "compatible translucent additive" refers to additives which are translucent to visible light (as defined above), which are compatible with an ink-jet ink composition as described herein, and which when added to the ink-jet ink composition reduce the level of visible light absorbed by the composition. Such additives are compatible if these additives do not render a substantially homogeneous ink-jet ink compositions non-homogeneous. The particular additive employed is not critical and suitable compatible translucent additives include, by way of example, gum rosin, rosin acids such as Balsam Canada, and hydrogenated rosin acids such as Foral Ax.

The term "substrate" or "transparency" refers to a transparent material onto which the ink composition is applied. Suitable substrates are well known in the art and include, for example, polyester, polycarbonate, polyacetate, and the like.

2. Synthesis and Methodology

The central aspect of the present invention is the discovery that the light scattering of solid (at 25° C.) ink-jet ink compositions containing drivers can be reduced by rendering the composition substantially homogeneous. Surprisingly, if the composition is substantially homogeneous, any granular or globular formation of the driver or of any other component in the composition which arises from phase separation will provide for granules or globules which are so small that the substantial homogeneity of the composition is not disrupted and minimal light scattering is obtained. In this regard, FIGS. 1A and 1B illustrate photomicrographs of different non-homogeneous ink-jet ink compositions. Specifically, the non-homogeneous ink-jet ink composition illustrated in FIG. 1A possesses multiple crystalline phases whereas the non-homogeneous ink-jet ink composition illustrated in FIG. 1B possesses 2 crystalline phases. As noted above, such multiple phases result in excessive light scattering which, in turn leads to poor color clarification of the projected image.

FIG. 2 illustrates a photomicrograph of a substantially homogeneous ink-jet ink composition. This composition provides for sufficient uniformity that light scattering is minimized and, in turn, color clarification improved.

Substantially homogeneous ink-jet ink compositions described herein are prepared by combining all of the ingredients and thoroughly mixing the components at a temperature above the melt point of the carrier until a substantially homogeneous composition is achieved. In general, such thorough mixing is accomplished by blending the components while in a liquid state using mechanical means to ensure that the composition becomes substantially homogeneous. Such means include blenders, magnetic stirrers and the like. Blending is continued for a period of time sufficient to assure substantially homogeneity. The specific time required to achieve a substantially homogenous composition depends on factors such as the amount of composition to be mixed, the mechanical means employed to mix the composition, and the like. However, in a preferred embodiment, such mixing is continued for at least about 0.1 hours and more preferably for about 0.1 to about 24 hours.

The mixing is conducted at a temperature above the melt point of the carrier to a temperature less than the decomposition point of any of the components of the ink. Preferably, the mixing is conducted at a temperature above the melt point of the carrier to less than about 250° C.

The composition is then cooled to provide for a substantially homogeneous solid ink composition of this invention. Other methods for preparing substantially homogeneous compositions are well known to the skilled artisan.

In a preferred embodiment, the degree of homogeneity and accordingly, the reduction in light scattering is improved by employing a cosolvent in the ink-jet ink composition. Because the cosolvent is miscible with both the carrier and the driver, it retards phase separation and accordingly, aids in the maintenance of a substantially homogeneous ink composition. Substantially homogeneous ink-jet ink compositions containing a cosolvent are prepared in the same manner as above with the exception that the cosolvent is added into the driver and carrier mixture.

In still a further preferred embodiment, the degree of translucency of the ink composition is improved if the composition includes a compatible translucent additive. Substantially homogeneous ink-jet ink compositions containing a compatible translucent additive are prepared in the same manner as above with the exception that the compatible translucent additive is added into the driver and carrier mixture. When a compatible translucent additive is employed, it is preferably to use this additive in combination with a cosolvent so as to ensure that the resulting ink-jet ink composition is substantially homogeneous.

Without being limited to any theory, it is believed that the compatible translucent additive increases the translucency of the ink-jet ink composition by retarding the formation of bulky crystals in the composition.

Preferably, the ink-jet ink compositions of this invention are formulated to contain at least about 5 weight percent of a non-volatile driver, from 0 to about 10 weight percent of a colorant, from about 30 to about 95 weight percent of a carrier, from 0 to about 50 weight percent of a cosolvent, and from 0 to about 50 weight percent of a compatible translucent additive each based on the total weight of the composition. Even more preferably, such compositions comprise from about 5 to about 30 weight percent of a driver based on the total weight of the composition. When a colorant is employed, it is preferably employed from about 3 to about 10 weight percent based on the total weight of the composition. When a cosolvent is employed, it is preferably employed from about 10 to about 50 weight percent based on the total weight of the composition. When a compatible translucent additive is employed, it is preferably employed from about 5 to about 50 weight percent based on the total weight of the composition.

In addition to these components, such compositions can contain one or more additives which enhance the ink with regard to (i) improved solubility of other components, (ii) improved print quality, (iii) improved adhesion of the ink to the media, and (iv) control of wetting characteristics, which may be related to such properties as surface tension and viscosity, (v) improve the mechanical properties of the ink, among other properties. Such additives are well known in the art. For example, dodecyl alcohol may be employed to improve the ability of the ink to wet the medium. Octadecanol and stearic acid may be separate additives to improve adhesion. When employed, the total of these additives generally comprise no more than about 50 weight percent of the weight of the total composition.

In a preferred embodiment, the ink-jet ink composition is formulated to have a viscosity of less than 20 centipoise at 90° C. and, more preferably, less than 10 centipoise at 90° C.

In another preferred embodiment, the ink-jet ink composition is formulated to have a surface tension of less than about 50 dynes per centimeter at 90° C. A particularly preferred composition has a surface tension of from about 20 to about 40 dynes per centimeter at about 90° C.

Additionally, the temperature differential between the operating temperature of the print head and the melting point of the ink composition is preferably at least 10° C. and also the temperature differential between the operating temperature of the print head and the temperature of the substrate is less than 100° C.

The viscosity of the formulated composition at 90° C. can be controlled by the appropriate selection of the carrier and the driver. Such selection is within the skill of the art. Ink compositions meeting defined criteria with regard to viscosity define ink compositions which will flow smoothly and rapidly at the operating temperature of the print head and accordingly, will not interfere with efficient printing operations.

On the other hand, the surface tension of a formulated ink composition can be reduced by the addition of one or more additives. Such additives include surfactants, alcohols, etc. which are well known for enhancing spreadability.

This is the appropriate point to note that the viscosity and surface tension values recited herein are recited at 90° C. only for a point of reference and are not to be inferred that operating temperatures other than 90° C. cannot be used. As it is well known in the art, both viscosity and surface tension values are variables depending on the temperature. Accordingly, if other operating temperatures are employed, the surface tension and viscosity values at the operating temperature will be different from that found at 90° C. However, solid ink compositions meeting the defined criteria at 90° C. will also provide for acceptable results at such other operating temperatures; provided of course that the above-defined temperature differentials are maintained.

The ink composition of this invention is employed in thermal ink-jet printing using thermally induced vapor bubbles to eject ink droplets from the printer onto the substrate. The specific thermal ink-jet printer employed is not critical and does not form a part of this invention. However, suitable ink-jet printers include those disclosed by Vaught et al. 3 which disclosure is incorporated herein by reference in its entirety. Other suitable ink-jet printers include SI 480 (commercially available from DataProducts, Woodland Hills, Calif.), and the like.

In regard to such printers, the difference between the operating temperature of the print head and the temperature of the substrate should be no more than 100° C., and preferably no more than 80° C. In particular, when this temperature differential is greater than 100° C., then the cooling gradient of the ejected ink drop is so great that premature freezing cannot not be prevented which, in turn, renders it impossible to control ink height. In this regard, the temperature of the substrate can be adjusted to within 100° C. of the operating temperature of the print head by heating the substrate. Methods for heating the substrate are well known in the art.

In a further preferred embodiment, the transparencies formed by the ink compositions described herein are improved by either posttreatment techniques or the use of chemically modified transparencies. Specifically, when a dot of ink forms on a substrate, the ink typically takes the shape of a hemisphere. When the hemisphere extends too great a distance away from the substrate, light passing through the hemisphere is scattered via a mechanism known as the lens effect. This effect is independent of the degree of homogeneity of the ink composition and depends only on the height of the ink dot. Methods for reducing the height of the ink dot will accordingly reduce the degree of light scattering arising from the lens effect. Methods for posttreating a substrate to reduce the degree of dot height are well known in the art and are disclosed by Gerstenmaier 4, Creagh et al. 5, and Van Brimer et al. 6, the disclosures of which are incorporated herein by reference in their entirety.

In particular, Gerstenmaier 4 discloses passing the marked substrate through rollers in order to minimize the height of such raised dots. Likewise, Creagh et al. 5 disclose the use of a liquid coating applied to the surface of the marked substrate which wets the surface of the substrate as well as the ink dots. The coating apparently reduces dot height by increasing the surface area of the dot. Also, Van Brimer et al. 6 disclose that the initially formed dots in a solid state can be flattened by heating the substrate and then subsequently cooling it.

In a preferred method, the degree of dot height can be reduced by use of a specific substrate which has been pretreated with an ink-absorbing thin optically translucent layer of coating (from about 10 to about 100 microns in thickness and which coating permits at least 65% of visible light to be transmitted through the coating) which allows greater penetration of the ink into the substrate as compared to a non-treated substrate. The substrate materials are normally polyester materials such as polyester phthalate (myler). One suitable coating for use with such substrate is a gelling material such as photographic gellation with a hydrophobic nature or long chain hydrocarbon materials so that the contact angle of the solid ink is less than 20 degrees. Also, the binding material to the substrate has to be added to the coating components.

When such a substrate is employed, it is also desirable to incorporate one or more additives to decrease the dot height of the ink-jet ink composition. Such additives are disclosed in U.S. Ser. No. 07/684,632 filed Apr. 12, 1991 which application is incorporated herein by reference in its entirety. In general, such additives include alcohols, penetrants (such as butyl carbitol or ethers), surfactants, and low viscosity waxes. As is apparent, when a suitable driver is employed, it can serve the dual role of driver and additive.

The following examples are offered to illustrate the present invention and are not to be construed in any manner as limiting it.

In these examples, the tradename materials were obtained from commercial sources. Specifically, materials were obtained as follows:

Balsam Canada—is a compatible translucent additive also known as Canada turpentine. Balsam Canada is well known in the art (see product no. 945 at page 137 of the 10th Ed. of the Merck Index which is incorporated herein by reference) and is commercially available from Aldrich Chemical Co., Milwaukee, Wis., 53201.

Durawax C—is a translucent wax well known in the art and which has the following characteristics:
1. a melting point (congealing point as measured by ASTM test D-938) of about 65° C.;
2. an average molecular weight of approximately 300–530;
3. a penetration value (measured by ASTM test D-1321) of 4–5 N @25° C.;
4. a refractive index (measured by ASTM test D1747 of 1.4345–1.4365 @100° C.;
5. an acid value (measured by ASTM test D-1386) of approximately 130–145;
6. a saponification value (measured by ASTM test D-1387) of approximately 140–155;
7. a specific gravity of approximately 0.98;
8. an iodine value of approximately 10;
9. an ester value of approximately 39; and
10. a flash point of 230° C.+ (446° F.+)

Durawax C is commercially available from Astor Wax Corporation, 111 Calvert St., P.O. Box 618, Harrison, N.Y. 10528-0618)

Gum Rosin—is a compatible translucent additive commercially available from Roger Reed, Inc., Industrial and Specialty Waxes, Reading, Mass. 01867

Neptune Red—is a dye based colorant commercially available from BASF, Holland, Mich., 49423

Foral Ax—is a compatible translucent additive commercially available from Hercules Inc., Wilmington, Del. 19894

Additionally, in the following examples, all percentages recited are weight percents based on the total weight of the ink-jet ink composition.

EXAMPLES

Example 1

This example illustrates a substantially homogeneous ink-jet ink composition of this invention. The ink-jet ink composition comprises 70 weight percent of Durawax C (carrier), 15 weight percent neopentanol (driver) and 15 weight percent 2,3-butanediol (driver). A substantially homogeneous composition is achieved for this composition by mechanically mixing the composition with a stirring bar while maintaining the temperature of the composition at a point where the composition is a liquid. The composition is then cooled to solidification under ambient conditions (without stirring) to provide for a substantially homogeneous ink-jet ink composition. A photomicrograph of this composition illustrates that it is substantially homogeneous (FIG. 2). Use of this composition in a transparency provides for a haze meter reading of less than 15 (for a mark of 1 mil thickness).

Comparative Examples A and B

These examples illustrates ink-jet ink compositions which are not substantially homogeneous and accordingly, are not compositions of this invention. The formulations are as follows:

|  | Comparative Ex. A | Comparative Ex. B |
|---|---|---|
| carrier: | 70% stearic acid | 60% paraffin |
|  |  | 10% stearic acid |
| driver: | 15% neopentanol | 15% neopentanol |
|  | 15% 2,3-butanediol | 15% 2,3-butanediol |

Each of these compositions were prepared using procedures which did not result in the formation of a substantially homogeneous ink-jet ink composition. This is evidenced by photomicrographs of these compositions which show more than one crystalline phase in each composition (FIGS. 1A and 1B).

EXAMPLES 2-4

Ink-jet ink compositions of this invention were formulated to contain a carrier, driver, cosolvent and optionally a colorant. The compositions were as follows:

|  |  | Ex. 2 | Ex. 3 | Ex. 4 |
|---|---|---|---|---|
| Carrier: | Durawax C | 33.3% | 53.5% | 52.1% |
| Driver: | Isobutyramide | 16.7% | 25.7% | 26.1% |
| Cosolvent: | Stearamide | 50.0% | — | — |
|  | Isopropylphenol | — | 19.8% | — |
|  | t-butylphenol | — | — | 20.8% |
| Colorant: | Neptune Red | — | 1.0% | 1.0% |

Each of the compositions were rendered substantially homogeneous by first heating the composition to a temperature wherein a liquid formulation was achieved and then mechanically mixing the mixture at this temperature by use of a magnetic stirring bar. Mixing was continued until a substantially homogenous liquid composition was achieved (e.g., 0.5 hours). Afterwards, the composition was cooled to solidification which produced a substantially homogeneous ink composition.

Employing these ink-jet ink compositions in a thermal ink jet printer so as to provide a 1 mil thick mark on a transparent substrate provides for marks having haze meter readings of less than 15 which evidences that the compositions are substantially homogeneous.

While not essential, the use of a cosolvent in these compositions facilitates the formation of substantially homogeneous composition.

COMPARATIVE EXAMPLES C-H

These examples illustrate the use of a compatible translucent additive to increase the translucency of the ink composition. These examples are not true examples of this invention because they do not employ a driver but do illustrate that the addition of a compatible translucent additive to a carrier increases the degree of translucency of the carrier. The translucent additive employed in these examples is gum rosin, available from Roger Reed as product no. 89106, and the carriers are either stearic acid or Durawax C.

Comparative Examples C, D, E and F were formulated without colorant whereas Comparative Examples G and H were formulated to contain 7 weight percent of a red dye. The formulations are as follows:

|  | C | D | E | F | G | H |
|---|---|---|---|---|---|---|
| Stearic Acid | 100% | 70% | — | — | — | — |
| Durawax C | — | — | 100% | 80% | 93% | 73% |
| Gum Rosin | — | 30% | — | 20% | — | 20% |
| Colorant | — | — | — | — | 7% | 7% |

In all cases, the addition of gum rosin increased the degree of ink translucency. Specifically, in a 3 mil thick mark, the addition of 30 weight percent of gum rosin to stearic acid resulted in a decrease in absorbance of from 0.516 to 0.250; the addition of 20 weight percent of gum rosin to Durawax C resulted in a decrease in absorbance of from 0.07 to 0.025; and the addition of 20 weight percent of gum rosin to Durawax C containing 7 weight percent red dye resulted in a decrease in absorbance of from 0.275 to 0.25.

Other compatible translucent additives could be employed in place of gum rosin in the compositions of this invention including, by way of example, Balsam Canada, Foral AX and the like. When employed, it may be desirable to employ a cosolvent in order to ensure that the formulation is substantially homogeneous.

Similarly, other ink-jet ink compositions as per this invention can be prepared by use of other suitable carriers and drivers and other suitable optional additives such as colorants, cosolvents, and compatible translucent additives. For example, one suitable composition comprises: 15% neopentyl alcohol, 15% 2,3-butanediol, 3–10% colorant (e.g., Morfast 101 black dye), 30–40% Durawax C, and 30% gum rosin.

What is claimed is:

1. An ink-jet ink composition which is solid at 25° C. and liquid at the operating temperature of the print head of the ink jet and which is suitable for use in preparing colored transparencies which composition comprises:
   (a) a carrier which is translucent to visible light and which is solid at 25° C. and liquid at the operating temperature of the print head of an ink-jet;
   (b) a non-volatile driver which has a solubility of at least 10% in the carrier and which is translucent to visible light when combined in the ink-jet ink composition;
   (c) a cosolvent; and
   (d) a compatible translucent additive,
   and wherein the composition is sufficiently homogeneous so as to provide for haze meter readings of less than about 15 when a 1 mil thick sample of the composition is placed on a transparency.

2. A solid ink-jet ink composition as described in claim 1 wherein the carrier is a translucent wax having a melting point of about 65° C. as measured by ASTM test D-938 and an average molecular weight of about 300 to 530.

3. A solid ink-jet ink composition as described in claim 1 wherein the non-volatile driver is a solid at 25° C. and is selected from the group consisting of propionamide and isobutyramide.

4. A solid ink-jet ink composition as described in claim 1 which further comprises a colorant.

5. A solid ink-jet ink composition as described in claim 1 wherein the cosolvent is selected from the group consisting of stearamide, t-butylphenol and isopropylphenol.

6. A solid ink-jet ink composition as described in claim 1 wherein said compatible translucent additive is selected from the group consisting of gum rosin, rosin acids, and hydrogenated rosin acids.

7. A solid ink-jet ink composition as described in claim 1 wherein said composition has a surface tension of less than about 50 dynes per centimeter at 90° C. and a viscosity of less than 20 centipoise at 90° C.

8. A solid ink-jet ink composition as described in claim 7 wherein said composition has a surface tension of from about 20 to about 40 dynes per centimeter at 90° C. and a viscosity of less than 10 centipoise at 90° C.

9. An ink-jet ink composition which is solid at 25° C. and liquid at the operating temperature of the print head of an ink jet and which is suitable for use in preparing colored transparencies which composition comprises:

(a) from about 30 to about 95 weight percent of a carrier based on the total weight of the ink-jet ink composition which carrier is translucent to visible light and which is solid at 25° C. and liquid at the operating temperature of the print head of an ink-jet;

(b) at least about 5 weight percent of a non-volatile driver based on the total weight of the ink-jet ink composition which non-volatile driver has a solubility of at least 10% in the carrier and which is translucent to visible light when combined in the ink-jet ink composition;

(c) from about 10 to about 50 weight percent of a cosolvent based on the total weight of the ink-jet ink composition; and (d) from about 5 to about 50 weight percent of a compatible translucent additive based on the total weight of the ink-jet ink composition, wherein the composition is sufficiently homogeneous so as to provide for haze meter readings of less than about 15 when a 1 mil thick sample of the composition is placed on a transparency.

10. An ink-jet composition according to claim 9 which further comprises up to about 10 weight percent of a colorant.

11. A solid ink-jet ink composition as described in claim 9 wherein the carrier is a translucent wax having a melting point of about 65° C. as measured by ASTM test D-938 and an average molecular weight of about 300 to 530.

12. A solid ink-jet ink composition as described in claim 9 wherein the non-volatile driver is a solid at 25° C. and is selected from the group consisting of propionamide and isobutyramide.

13. A solid ink-jet ink composition as described in claim 12 wherein the cosolvent is selected from the group consisting of stearamide, t-butylphenol and isopropylphenol.

14. A solid ink-jet ink composition as described in claim 12 wherein said compatible translucent additive is selected from the group consisting of gum rosin, rosin acids, and hydrogenated rosin acids.

15. A solid ink-jet ink composition as described in claim 14 wherein said composition has a surface tension of less than about 50 dynes per centimeter at 90° C. and a viscosity of less than 20 centipoise at 90° C.

16. A solid ink-jet ink composition as described in claim 15 wherein said composition has a surface tension of from about 20 to about 40 dynes per centimeter at 90° C. and a viscosity of less than 10 centipoise at 90° C.

17. A method for preparing a colored transparency from a thermal ink-jet printer which method comprises:

(a) selecting an ink-jet ink composition which is solid at 25° C. and liquid at the operating temperature of the print head of an ink-jet and which comprises:

a carrier which is translucent to visible light and which is solid at 25° C. and liquid at the operating temperature of the print head of an ink-jet;

a non-volatile driver which has a solubility of at least 10% in the carrier and which is translucent to visible light when combined in the ink-jet ink composition;

a cosolvent;

a compatible translucent additive; and a colorant wherein said ink composition is sufficiently homogeneous so as to provide for haze meter readings of less than about 15 when a 1 mil thick sample of the composition is placed on a transparency; and (b) employing said ink composition in a thermal ink-jet printer used for preparing transparencies; and (c) preparing said transparencies.

18. A method for preparing a colored transparency as described in claim 17 wherein the non-volatile driver is a solid at 25° C. and is selected from the group consisting of propionamide and isobutyramide.

19. A method for preparing a colored transparency as described in claim 17 wherein the cosolvent is selected from the group consisting of stearamide, t-butylphenol and isopropylphenol.

20. A method for preparing a colored transparency as described in claim 17 wherein said compatible translucent additive is selected from the group consisting of gum rosin, rosin acids and hydrogenated rosin acids.

21. A method for preparing a colored transparency as described in claim 17 which further comprises post-treating the prepared transparency so as to reduce dot height.

22. A method for preparing a colored transparency as described in claim 17 wherein the substrate has been pretreated with an ink-absorbing optically translucent layer of coating which allows greater penetration of the ink into the substrate as compared to a substrate which has not been pretreated.

* * * * *